Aug. 6, 1929.                H. CAMINEZ                  1,723,012
                         AIRCRAFT ENGINE MOUNT
                          Filed Nov. 25, 1927
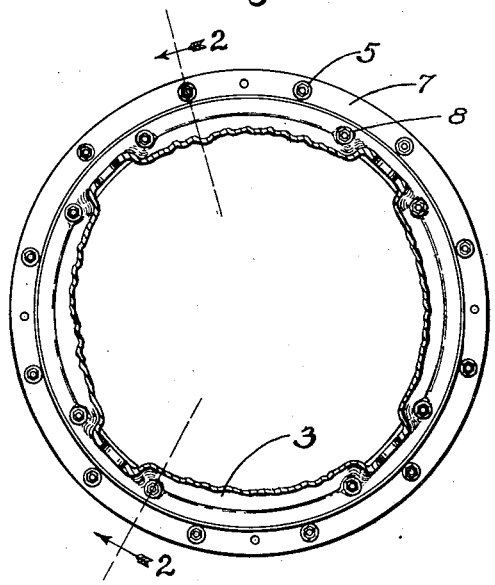
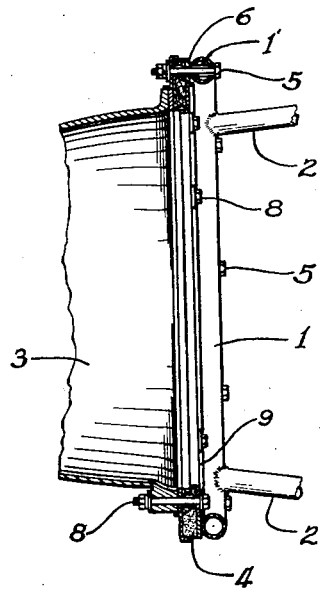
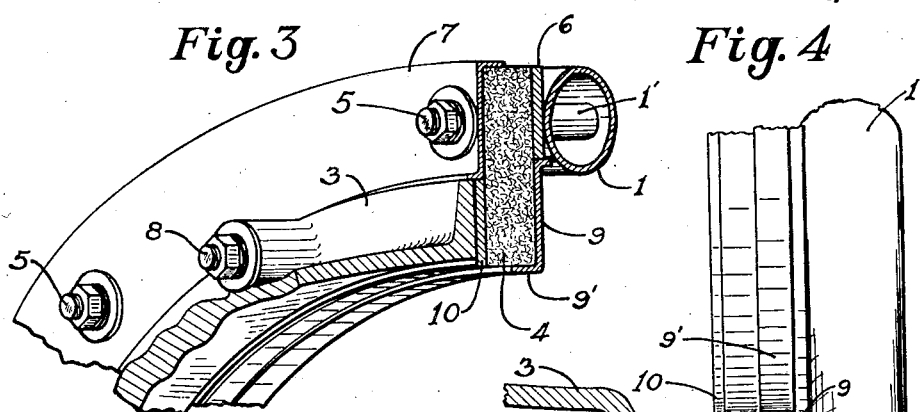
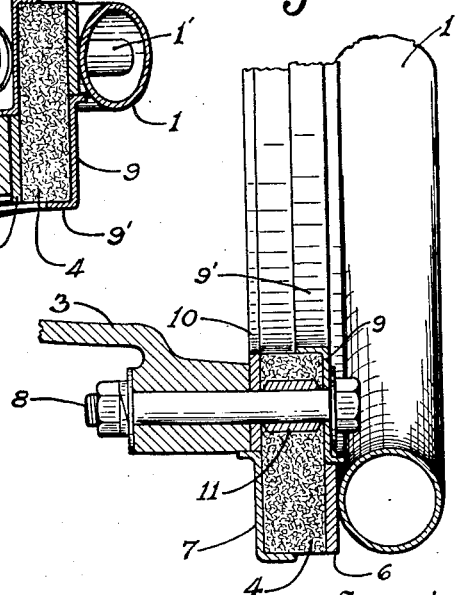
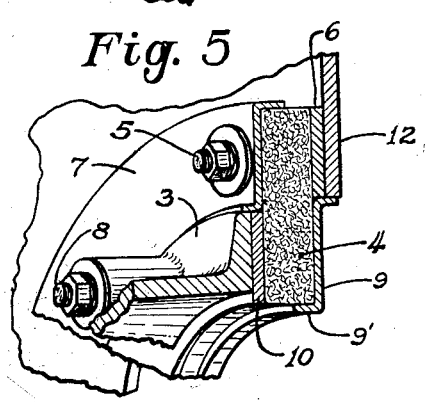
Inventor
HAROLD CAMINEZ
By his Attorney
B H Carpenter Patented Aug. 6, 1929.

1,723,012

UNITED STATES PATENT OFFICE.

HAROLD CAMINEZ, OF GARDEN CITY, NEW YORK, ASSIGNOR TO FAIRCHILD-CAMINEZ ENGINE CORPORATION, OF NEW YORK, N. Y., A CORPORATION OF NEW YORK.

AIRCRAFT ENGINE MOUNT.

Application filed November 25, 1927. Serial No. 235,545.

This invention relates to internal combustion engines in general and has for its general object to provide a new and improved means for mounting the engine of an aeroplane.

The specific object of this invention is to provide means for attaching an engine to an aeroplane in such a manner as to reduce the destructive wear produced upon the fuselage by vibration of the engine.

It has been found in practice that engines which are mounted directly upon the frame of an aeroplane have a very destructive effect on the frame, as well as producing discomfort for the passengers and pilot.

All usual types of internal combustion motors vibrate in some degree and it is impossible to entirely eliminate such vibration even with motors which have been very carefully designed and constructed. Furthermore, while an aeroplane is in flight, its engine exerts a varying pull or push upon the fuselage or frame, depending, of course, upon whether the plane is of the tractor type or of the pusher type. The vibration produced by the engine is largely torsional with respect to the crank-shaft and is transmitted torsionally to the engine mounting and therefore to the fuselage or frame.

The torsional vibration produced is due to the variation in torque produced by the explosion occurring in each cylinder of a reciprocating engine. It is obvious that this torque variation will tend to vibrate the engine.

Radial engines are commonly mounted upon the fore part or "nose" of aircraft and are usually built with a substantially circular base casting which is usually concentric with the engine shaft and which is adapted to be attached to a substantially vertical disposed ring or nose-plate upon the aircraft frame. It will be obvious, that it is undesirable to transmit torque vibrations to the frame parts of the aircraft, inasmuch as the frame must be made very light in order to reduce the weight of the aeroplane.

It is the principal object of this invention to provide a simple and efficient supporting member, constructed with a resilient material for the purpose of absorbing the torsional impulses produced by the engine and to transmit the torque of the engine to the fuselage or frame as a simple torsional stress which will not have a destructive vibration effect upon the fuselage.

Another object of this invention is to provide a resilient cushioning of the tractive or pushing force exerted by the engine and propeller on the aircraft.

Other objects and advantages of this invention will become apparent from the following specification, claims and appended drawings, in which:—

Fig. 1 is a vertical plan view partly in section, showing the engine crank-case in position on the flexible supporting member.

Fig. 2 is a section taken on the line 2—2 of Fig. 1.

Fig. 3 is a perspective view, partly in section, showing the means for attaching the flexible supporting member to the fuselage of an aeroplane.

Fig. 4 is a section taken through the lower half of Fig. 1 showing the construction of the means for attaching the engine crank-case to the flexible supporting member.

Fig. 5 is a perspective view, partly in section, illustrating a modification of the construction shown in Fig. 3.

Referring to the drawings, 1 represents a ring-shaped piece of tubing carried on the forward portion of the fuselage longérons 2, Fig. 2. The engine, of which 3 represents the crank-case or base casting, is mounted from the ring through a flexible supporting member now to be described. As best shown in Figs. 2 to 4, the crank-case 3 is not carried directly by the ring 1 but is mounted upon a ring-shaped flexible member 4 which is constructed of resilient material and is interposed between the ring 1 and the crank-case 3.

The flexible member 4 is attached to the ring 1 by means of bolts 5 passing thru the ring 1 and the flexible member 4 and each provided with a suitable nut, washer, and lock washer, as is clearly shown in the drawings. An annular ring 6 is interposed between the flexible member 4 and the ring 1 for the purpose of giving a support to the flexible member 4 and for other purposes which will hereinafter be more fully described. On the other side of the flexible member 4 from the ring 6, that is on the outer side, an annular metal ring 7 is provided having an outwardly turned inner flange and an inwardly turned outward flange, as is clearly shown in the drawings. The outer flange of this member serves to support the outer edge of the resilient member 4 while the inner flange is for the purpose of providing a transverse support for the engine as will be more fully set forth hereinafter. If desired bushings 1' may be provided in the ring 1, one for each bolt 5, to strengthen the ring at the point of passage of the bolt. If desired these bushings may be united to the ring 1 by welding, brazing, or in any other suitable manner. From the foregoing it will be apparent that the resilient member 4 is securely clamped to the ring 1.

The engine is secured to the resilient member 4 in a manner now to be described. The engine is provided with a crank-case having an annular base flange 3 of an external diameter slightly less than the internal diameter of the outwardly extending flange of the ring 7. An annular ring 10 of an external diameter slightly less than that of the ring 7 is positioned within the ring 7 and adjacent the resilient ring 4. The annular base 3 of the engine rests against the outer surface of the ring 10, as is clearly shown in Fig. 4. An annular ring nut 9 is provided with outwardly turned flange 9' extending within the resilient ring 4 and supporting the same against distortion and with an outwardly extending flange closely fitting with an annular ring 6, as is clearly shown in Fig. 4. The base flange 3, ring 10, resilient ring 4, and ring 9, are secured together by bolts 8 passing thru the same, as shown in Figs. 2, 3, and 4. These bolts are provided with nuts, washers, and lock washers as is customary in practice and firmly secures the engine to the resilient ring 4.

The rings 7 and 9 are flanged for a two-fold purpose. The inner flange of the ring 7 and the outer flange of the ring 9 serve to hold the crank-case in alignment and support substantially the entire weight of the engine while the outer flange of the ring 7 and inner flange of the ring 9 serve to prevent bulging or extrusion of the resilient material of which the flexible member 4 is composed. In practice the fit between the rings 7 and ring 10 is quite close so that no movement relative to each other is permitted in a direction transverse to their central axis. Likewise, the outer flange of ring 9 fits closely within the ring 6, the latter serving to keep the ring 9 in alignment and to bear part of the weight of the engine. The inner flange of ring 9 prevents bulging of the inside surface of flexible member 4. If desired, the rings 6 and 10 may be flanged in a similar manner and for the same purpose.

The flexible member 4 may be composed of any suitable resilient material such as rubber, fibroid, textile material and rubber vulcanized together or in many other ways well-known in the art. I do not desire to limit myself in any way to the material used as long as the material is resilient. In practice it has been found desirable to provide bushings 11 in the resilient ring, one for each bolt. The purpose of these bushings is to prevent cutting or tearing the resilient material by the bolts. If desired, these bushings may be made of sufficient length to support a material amount of the clamping strain exerted by the bolts upon the resilient member 4. I do not desire to limit myself in this respect in any way however.

The holes in the flexible member through which the bolts 5 and 8 pass are so disposed that they are in a staggered formation, the object being to prevent weakening of the resilient material which would be the case if the holes through which the bolts 5 passed were directly opposite the holes thru which the bolts 8 pass. Furthermore, this construction places a larger amount of resilient material between the bolts 5 and bolts 8 and, as a result, increases the ability of the resilient member 4 to absorb vibration.

The flanged rings 7 and 9 are so constructed that the inside diameter of the ring 7 is somewhat greater than the inside diameter of the ring 9, the object of this construction being to avoid a direct shearing stress in the flexible member 4 and also to provide a bearing surface for the axial driving force produced by the engine upon its mounting while the aeroplane is in flight.

In some types of aeroplanes a plate or nose-piece may be used to support the engine instead of supporting it upon the ring 1. For this reason a modification of the present invention showing the method of attachment to such a nose plate is illustrated in Fig. 5. The parts shown in this figure bear the same reference numerals and have the same shape and function as the parts shown in Figs. 1 to 4. The nose plate is represented by the numeral 12 and consists of a plate fitted to the nose or fore part of the aeroplane. This plate is provided with a circular aperture which fits smoothly over the outer flanged ring 9 and assists in supporting part of the weight of the engine and serves to align the crank-case 3.

It will be apparent from the foregoing description and the accompanying drawings that the embodiment of this invention just described is admirably adapted to perform the functions of a vibration absorber and, furthermore, is simple in construction, has few working parts, and adds little additional weight to the dead weight of the aeroplane to which it may be attached and when so attached serves to diminish the destructive effects of vibration upon the frame or fuselage of the aeroplane to a very marked extent. The reduction in the amount of vibration permits a lighter frame construction to be used, and in consequence, the cost of manufacture of the aeroplane may be reduced and its load carrying capacity increased. The comfort of passengers and pilot is also increased. This latter advantage is of great importance in sport and commercial passenger aeroplanes.

It is evident that the hereinbefore described engine mountings are adaptable for mounting engines from wing nacelles, flying boats, hydroplanes, etc. I do not therefore desire to limit myself in any way to the embodiments shown and described.

Various changes in the construction of the embodiment illustrated in the drawings may be made without departing from the spirit of the invention, and I do not therefore desire to limit myself to the specific construction shown and described, but to interpret the invention broadly within the scope of the appended claims.

What I claim as my invention is:

1. The combination with a frame and an engine having a base flange, of a member secured to said frame, and supporting the weight of said engine, a resilient member secured to said flange and said first member for transmitting the driving forces of said engine to said frame and cushioning torsional impulses.

2. The combination with a frame and an engine having a circular base flange of a rigid member secured to said base flange and extending outwardly therebeyond, a resilient member secured between said rigid member and said base flange and extending outwardly beyond said rigid member, and a second rigid member secured to said frame and said resilient member and overlapping said first rigid member with the resilient member therebetween.

3. In a device for mounting an engine in an aircraft the combination with an aircraft frame and an engine having a base flange of a resilient member, means for securing said member to said base flange and extending outwardly therebeyond, and means in staggered relation to the first-named securing means for securing the outer portion of the resilient member to said aircraft frame.

4. In a device for mounting an engine in an aircraft the combination with an aircraft frame and an engine, of a resilient member, means for securing said member to said engine, and means in staggered relation to the aforementioned securing means for securing the resilient member to said aircraft frame whereby great cushioning of torsional impulses is afforded.

5. The combination with an engine and a frame of means for securing said engine to said frame including a rigid member secured to said frame, a resilient member between said rigid member and the frame, a second rigid member overlapping the first rigid member and on the opposite side of the resilient member, and means for securing the second rigid member to said engine with the resilient member therebetween.

6. The combination with a frame and an engine having a base, of means for securing said engine to said frame including a resilient member, a pair of rigid members one on each side of said resilient member, and secured to said frame by means passing thru each of said members, a second pair of rigid members one on each side of said resilient member and secured to said engine base by means passing thru each of said members, one member of the first pair and the diagonally opposite member of the second pair overlapping one another.

7. The combination with an aircraft and an engine, having a base, of means for securing said engine to said aircraft including a pair of rigid rings and a resilient ring member all secured together and to the aircraft with the resilient member between the rigid members, a second pair of rigid rings one on each side of said resilient member and secured together with the resilient member to the engine base, one member of the first pair overlapping the diagonally opposite member of the second pair.

8. The combination with an aircraft and an engine, having a base, of means for securing said engine to said aircraft including a pair of rigid rings and a resilient ring member all secured together and to the aircraft with the resilient member between the rigid members, a second pair of rigid rings, one on each side of said resilient member and secured together with the resilient member to the engine base, one member of the first pair overlapping the diagonally opposite member of the second pair, the rings of the first and second pairs cooperating to support the weight of the engine.

9. The combination with an aircraft and a radial engine having a base formed with a flange having a face approximately perpendicular to the motor axis, of a resilient member extending along and abutting said face and means for independently securing said resilient member to said flange and to said aircraft whereby tortional impulses are greatly cushioned and absorbed.

10. The combination with an engine having a base flange, of a supporting means extending in close proximity to but not overlapping said base flange, and a resilient member overlapping and independently secured to said base flange and said supporting means.

11. The combination with an engine having a supporting flange surrounding the main axis of the engine, of an engine supporting member extending adjacent to said supporting flange but spaced therefrom in the direction of extent of the main axis of the engine, and a resilient member between said flange and said supporting member and independently secured to said flange and said member whereby tortional impulses are cushioned and absorbed.

In testimony whereof I affix my signature.

HAROLD CAMINEZ.